United States Patent
Hao et al.

(10) Patent No.: US 11,490,279 B2
(45) Date of Patent: Nov. 1, 2022

(54) CHANNEL STATE DETERMINATION OR REFERENCE SIGNALING WITH TRAFFIC PREEMPTION

(71) Applicant: QUALCOMM Incorporated, San Diego, CA (US)

(72) Inventors: Chenxi Hao, Beijing (CN); Yu Zhang, Beijing (CN); Wanshi Chen, San Diego, CA (US); Peter Gaal, San Diego, CA (US); Tao Luo, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/733,502

(22) PCT Filed: Jan. 17, 2019

(86) PCT No.: PCT/CN2019/072187
§ 371 (c)(1),
(2) Date: Aug. 13, 2020

(87) PCT Pub. No.: WO2019/157902
PCT Pub. Date: Aug. 22, 2019

(65) Prior Publication Data
US 2021/0120442 A1    Apr. 22, 2021

(30) Foreign Application Priority Data
Feb. 15, 2018 (WO) ............... PCT/CN2018/076911

(51) Int. Cl.
*H04W 24/10* (2009.01)
*H04L 5/00* (2006.01)

(52) U.S. Cl.
CPC ........... *H04W 24/10* (2013.01); *H04L 5/0057* (2013.01); *H04L 5/0062* (2013.01)

(58) Field of Classification Search
CPC ..... H04W 24/10; H04L 5/0057; H04L 5/0062
See application file for complete search history.

(56) References Cited

U.S. PATENT DOCUMENTS 9,537,638 B2    1/2017  Geirhofer et al.
2011/0199986 A1 *  8/2011  Fong ..................... H04L 5/0073
                                                370/329

(Continued)

FOREIGN PATENT DOCUMENTS

CN      104081813 A      10/2014
EP      3091781 A1 *    11/2016    ............ H04W 24/10

(Continued)

OTHER PUBLICATIONS

International Search Report and Written Opinion—PCT/CN2018/076911—ISA/EPO—dated Nov. 7, 2018.

(Continued)

*Primary Examiner* — Deepa Belur
(74) *Attorney, Agent, or Firm* — Qualcomm Incorporated

(57) ABSTRACT

Various aspects of the present disclosure generally relate to wireless communication. In some aspects, a user equipment (UE) may determine that one or more measurement reference resources, of a plurality of measurement reference resources, are preempted; and, based at least in part on the determination, selectively: cancel transmission of a measurement report, or transmit the measurement report based at least in part on at least a portion of the plurality of measurement reference resources. In some aspects, the UE may determine that one or more uplink reference signal resources, of a plurality of uplink reference signal resources, are to be preempted; and, based at least in part on the determination, selectively: cancel transmission of an uplink reference signal, or transmit the uplink reference signal (Continued)

based at least in part on at least a portion of the plurality of uplink reference signal resources. Numerous other aspects are provided.

30 Claims, 12 Drawing Sheets

(56) References Cited

U.S. PATENT DOCUMENTS

| | | | | |
|---|---|---|---|---|
| 2012/0113850 A1* | 5/2012 | Fu | ............... | H04W 72/1231 |
| | | | | 370/252 |
| 2013/0010707 A1* | 1/2013 | Gaal | ............... | H04W 68/00 |
| | | | | 370/329 |
| 2013/0196675 A1* | 8/2013 | Xiao | ............... | H04W 24/08 |
| | | | | 455/452.1 |
| 2013/0208677 A1* | 8/2013 | Lee | ............... | H04L 1/0078 |
| | | | | 370/329 |
| 2018/0279291 A1* | 9/2018 | Tiirola | ............... | H04B 1/713 |
| 2019/0230549 A1* | 7/2019 | Wang | ............... | H04B 7/0417 |
| 2019/0349052 A1* | 11/2019 | Yum | ............... | H04B 7/0626 |
| 2019/0349126 A1* | 11/2019 | Andgart | ............... | H04L 1/0013 |
| 2020/0266922 A1* | 8/2020 | Zhang | ............... | H04L 5/0042 |

FOREIGN PATENT DOCUMENTS

| | | | |
|---|---|---|---|
| WO | WO-2016180098 A1 * | 11/2016 | ............ H04W 24/00 |
| WO | WO-2017173033 A1 | 10/2017 | |
| WO | WO-2018031066 A1 * | 2/2018 | |

OTHER PUBLICATIONS

International Search Report and Written Opinion—PCT/CN2019/072187—ISA/EPO—dated Mar. 29, 2019.

VIVO: "Multiplexing Data with Different Transmission Durations", 3GPP Draft, R1-1800205, 3GPP TSG WG1 Meeting AH 1801, 3rd Generation Partnership Project (3GPP), Mobile Competence Centre; 650, Route Des Lucioles; F-06921 Sophia-Antipolis, vol. RAN WG1, No. Vancouver, Canada, Jan. 22-26, 2018, Jan. 13, 2018 (Jan. 13, 2018), 6 Pages, XP051384694, Retrieved from the Internet: URL: http://www.3gpp.org/ftp/tsg_ran/WG1_RL1/TSGR1_AH/NR_AH_1801/Docs/ and URL:http://www.3gpp.org/ftp/tsg%5Fran/WG1%5FRL1/TSGR1%.

ZTE., et al., "Summary of Remaining Issues on CSI Measurement," R1-1721634, 3GPP TSG RAN WG1 Meeting #91, Reno, USA, Nov. 27-Dec. 1, 2017, 10 Pages.

Supplementary European Search Report—EP19755012—Search Authority—The Hague—dated Oct. 13, 2021.

ZTE: "UE-to-UE Measurement as an Enabler for CLI Mitigation Schemes", 3GPP Draft, 3GPP TSG RAN WG1 Meeting NR#3, R1-1715563—6.5.1 UE-to-UE Measurement as an Enabler for CLI Mitigation Schemes, 3rd Generation Partnership Project (3GPP), Mobile Competence Centre, 650, Route Des Lucioles, F-06921, vol. RAN WG1, No. Nagoya, Japan, Sep. 18, 2017-Sep. 21, 2017 Sep. 17, 2017 (Sep. 17, 2017), XP051339030, pp. 1-7, Retrieved from the Internet: URL:http://www.3gpp.org/ftp/Meetings_3GPP_SYNC/RAN1/Docs/ [retrieved on Sep. 17, 2017], p. 3, paragraph 3.1, p. 5, paragraph 3.2, p. 6, paragraph 4.1-paragraph 4.2, figure 1.

* cited by examiner

CHANNEL STATE DETERMINATION OR REFERENCE SIGNALING WITH TRAFFIC PREEMPTION

CROSS-REFERENCE TO RELATED APPLICATIONS

This application is a 371 national state of PCT Application No. PCT/CN2019/072187 filed on Jan. 17, 2019, entitled "CHANNEL STATE DETERMINATION OR REFERENCE SIGNALING WITH TRAFFIC PREEMPTION," which claims priority to Patent Cooperation Treaty (PCT) Patent Application No. PCT/CN2018/076911, filed on Feb. 15, 2018, entitled "TECHNIQUES AND APPARATUSES FOR CHANNEL STATE DETERMINATION OR REFERENCE SIGNALING WITH TRAFFIC PREEMPTION," both of which are hereby expressly incorporated by reference herein.

FIELD OF THE DISCLOSURE

Aspects of the present disclosure generally relate to wireless communication, and more particularly to techniques and apparatuses for channel state determination or reference signaling with traffic preemption.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include determining that one or more measurement reference resources, of a plurality of measurement reference resources, are preempted; and based at least in part on the determination, selectively: canceling transmission of a measurement report, or transmitting the measurement report based at least in part on at least a portion of the plurality of measurement reference resources.

In some aspects, a UE for wireless communication may include memory and one or more processors operatively coupled to the memory. The memory and the one or more processors may be configured to determine that one or more measurement reference resources, of a plurality of measurement reference resources, are preempted; and based at least in part on the determination, selectively: cancel transmission of a measurement report, or transmit the measurement report based at least in part on at least a portion of the plurality of measurement reference resources.

In some aspects, a non-transitory computer-readable medium may store one or more instructions for wireless communication. The one or more instructions, when executed by one or more processors of a UE, may cause the one or more processors to determine that one or more measurement reference resources, of a plurality of measurement reference resources, are preempted; and based at least in part on the determination, selectively: cancel transmission of a measurement report, or transmit the measurement report based at least in part on at least a portion of the plurality of measurement reference resources.

In some aspects, an apparatus for wireless communication may include means for determining that one or more measurement reference resources, of a plurality of measurement reference resources, are preempted; and based at least in part on the determination, means for selectively: canceling transmission of a measurement report, or transmitting the measurement report based at least in part on at least a portion of the plurality of measurement reference resources.

In some aspects, a method of wireless communication performed by a UE may include determining that one or more uplink reference signal resources, of a plurality of uplink reference signal resources, are to be preempted; and based at least in part on the determination, selectively: canceling transmission of an uplink reference signal, or transmitting the uplink reference signal based at least in part on at least a portion of the plurality of uplink reference signal resources.

In some aspects, a UE for wireless communication may include memory and one or more processors operatively coupled to the memory. The memory and the one or more processors may be configured to determine that one or more uplink reference signal resources, of a plurality of uplink reference signal resources, are to be preempted; and based at least in part on the determination, selectively: cancel transmission of an uplink reference signal, or transmit the uplink reference signal based at least in part on at least a portion of the plurality of uplink reference signal resources.

In some aspects, a non-transitory computer-readable medium may store one or more instructions for wireless communication. The one or more instructions, when executed by one or more processors of a UE, may cause the one or more processors to determine that one or more uplink reference signal resources, of a plurality of uplink reference signal resources, are to be preempted; and based at least in part on the determination, selectively: cancel transmission of an uplink reference signal, or transmit the uplink reference signal based at least in part on at least a portion of the plurality of uplink reference signal resources.

In some aspects, an apparatus for wireless communication may include means for determining that one or more uplink reference signal resources, of a plurality of uplink reference signal resources, are to be preempted; and based at least in part on the determination, means for selectively: canceling transmission of an uplink reference signal, or transmitting the uplink reference signal based at least in part on at least a portion of the plurality of uplink reference signal resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
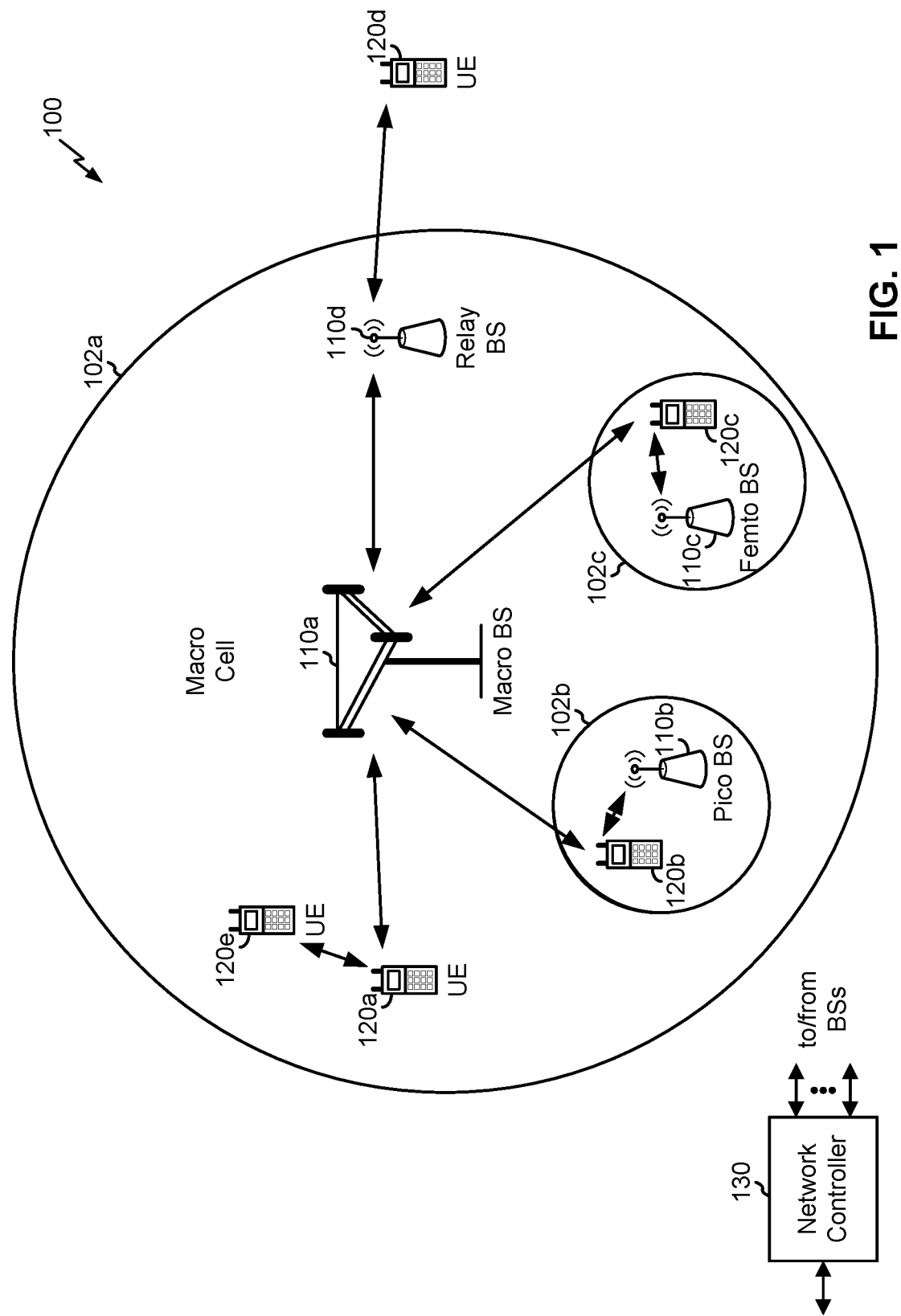
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
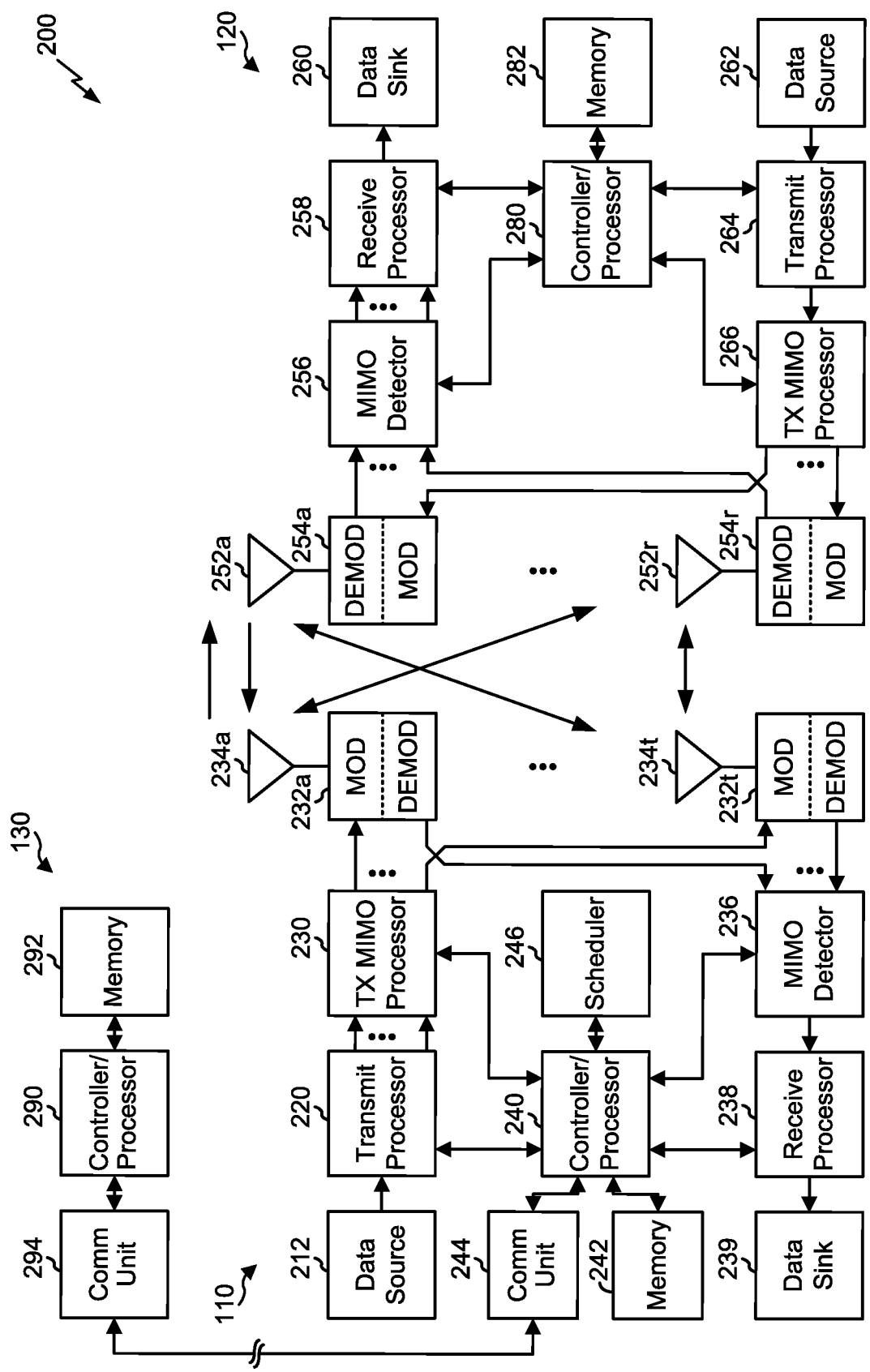
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with channel state determination and reference signaling with traffic preemption, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining that one or more measurement reference resources, of a plurality of measurement reference resources, are preempted; means for canceling transmission of a measurement report; means for transmitting the measurement report based at least in part on at least a portion of the plurality of measurement reference resources; means for determining that there exists at least one valid NZP CSI-RS resource for a channel measurement resource (CMR); means for determining that there is no valid NZP CSI-RS resources for a channel measurement resource (CMR); means for determining that there exists a valid interference measurement resource (IMR); means for determining that there exists no valid IMR; and/or the like. In some aspects, such means may include one or more components of UE 120 described in connection with FIG. 2.

In some aspects, UE 120 may include means for determining that one or more uplink reference signal resources, of a plurality of uplink reference signal resources, are to be preempted; means for canceling transmission of an uplink reference signal; means for transmitting the uplink reference signal based at least in part on at least a portion of the plurality of uplink reference signal resources; means for determining that there exists at least one valid uplink reference signal resource; means for determining that there is not at least one valid uplink reference signal resource; means for receiving one or more sounding resource indicators (SRIs) from a base station, wherein the one or more SRIs are associated with a valid uplink reference signal resource; and/or the like. In some aspects, such means may include one or more components of UE 120 described in connection with FIG. 2.

As indicated above, FIG. 2 is provided merely as an example. Other examples are possible and may differ from what was described with regard to FIG. 2.

5G/NR provides ultra-reliable low latency communications (URLLC), which may be associated with a heightened latency and/or reliability requirement in comparison to best-effort traffic, such as enhanced mobile broadband (eMBB) traffic. To achieve the heightened latency and/or reliability requirement, URLLC traffic may preempt or puncture best-effort traffic. Preemption and puncturing are used interchangeably herein. When data traffic is preempted, the data traffic may be retransmitted using resources other than resources used for the preempted traffic. In this way, URLLC traffic may be provided with lower latency than best-effort traffic, thereby satisfying the latency requirement associated with URLLC traffic.

However, some resources may be may be measurement or reference resources, such as channel state information reference signal (CSI-RS) resources, interference measurement resources (IMRs), channel measurement resources (CMRs), sounding reference signal (SRS) resources, and/or the like. When a measurement or reference resource is preempted for URLLC traffic, channel measurement or reference signaling of the UE may be impacted. For example, the UE may not receive an appropriate CSI-RS for channel measurement or may not be able to transmit an SRS due to preemption of the measurement or reference resource.

Some techniques and apparatuses described herein provide channel measurement and reference signal transmission based at least in part on preempted measurement or reference resources. For example, some techniques and apparatuses described herein selectively cancel transmission of a measurement report or reference signal, or transmit at least a portion of the measurement report or reference signal, based at least in part on information regarding measurement reference resources that are preempted or valid. In this way, the UE provides for improved reference signaling and channel measurement in networks using URLLC, such as 5G/NR networks. Furthermore, the UE increases a pool of available resources for preemption by gracefully handling preemption of measurement reference resources.

Figure 3A:
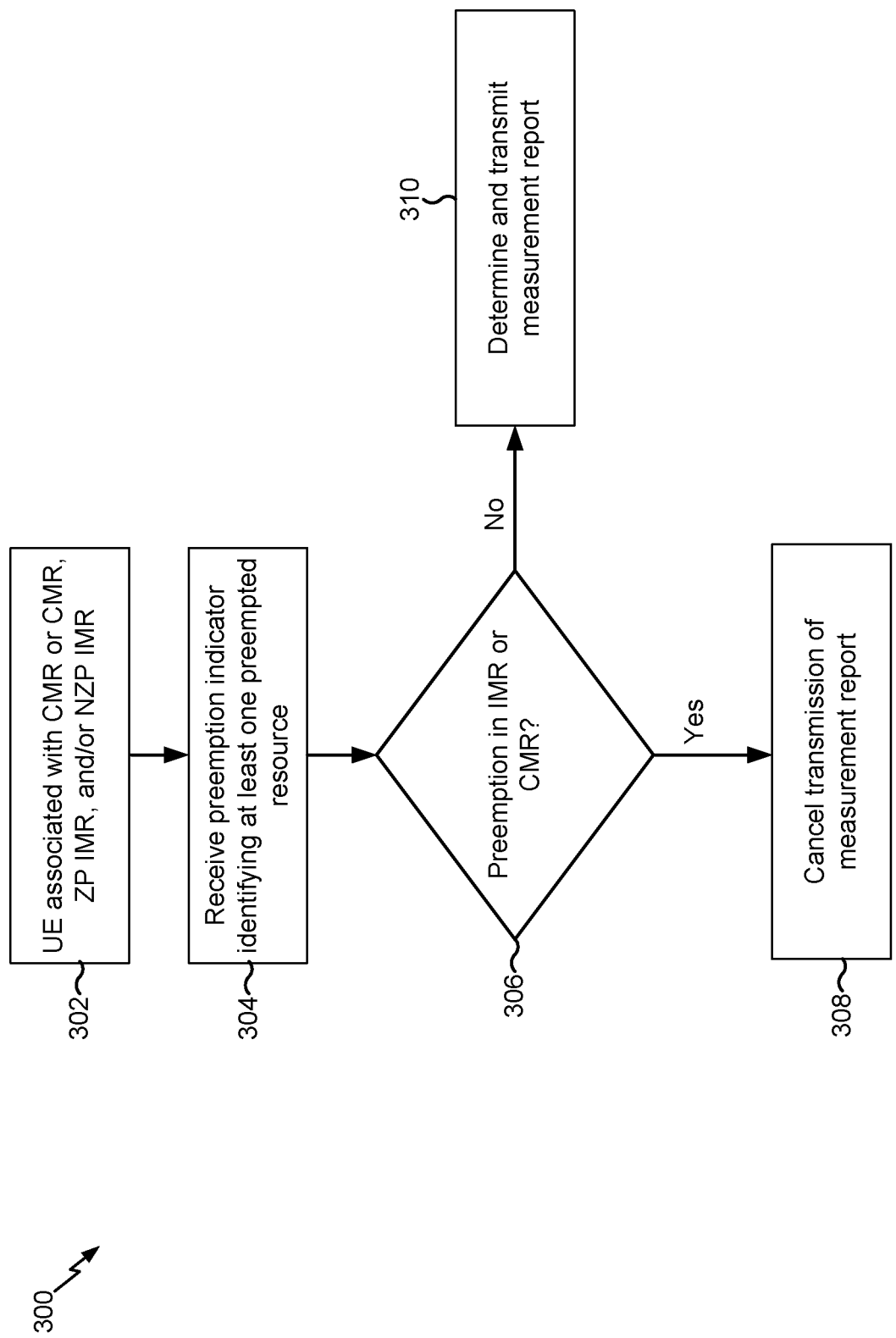
FIGS. 3A-3C are diagrams illustrating examples of channel state determination with traffic preemption, in accordance with various aspects of the present disclosure.
Figure 3B:
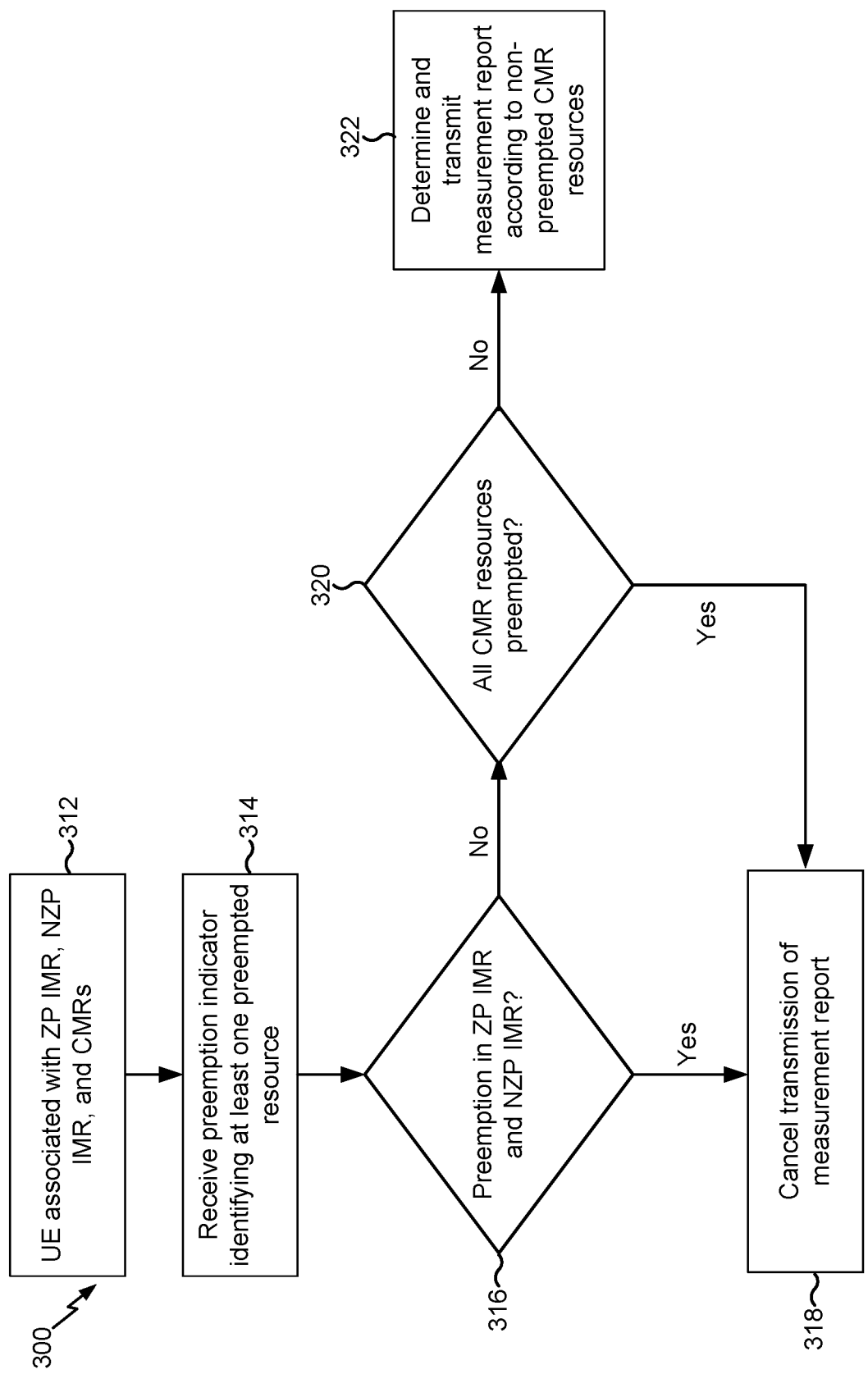
Figure 3C:
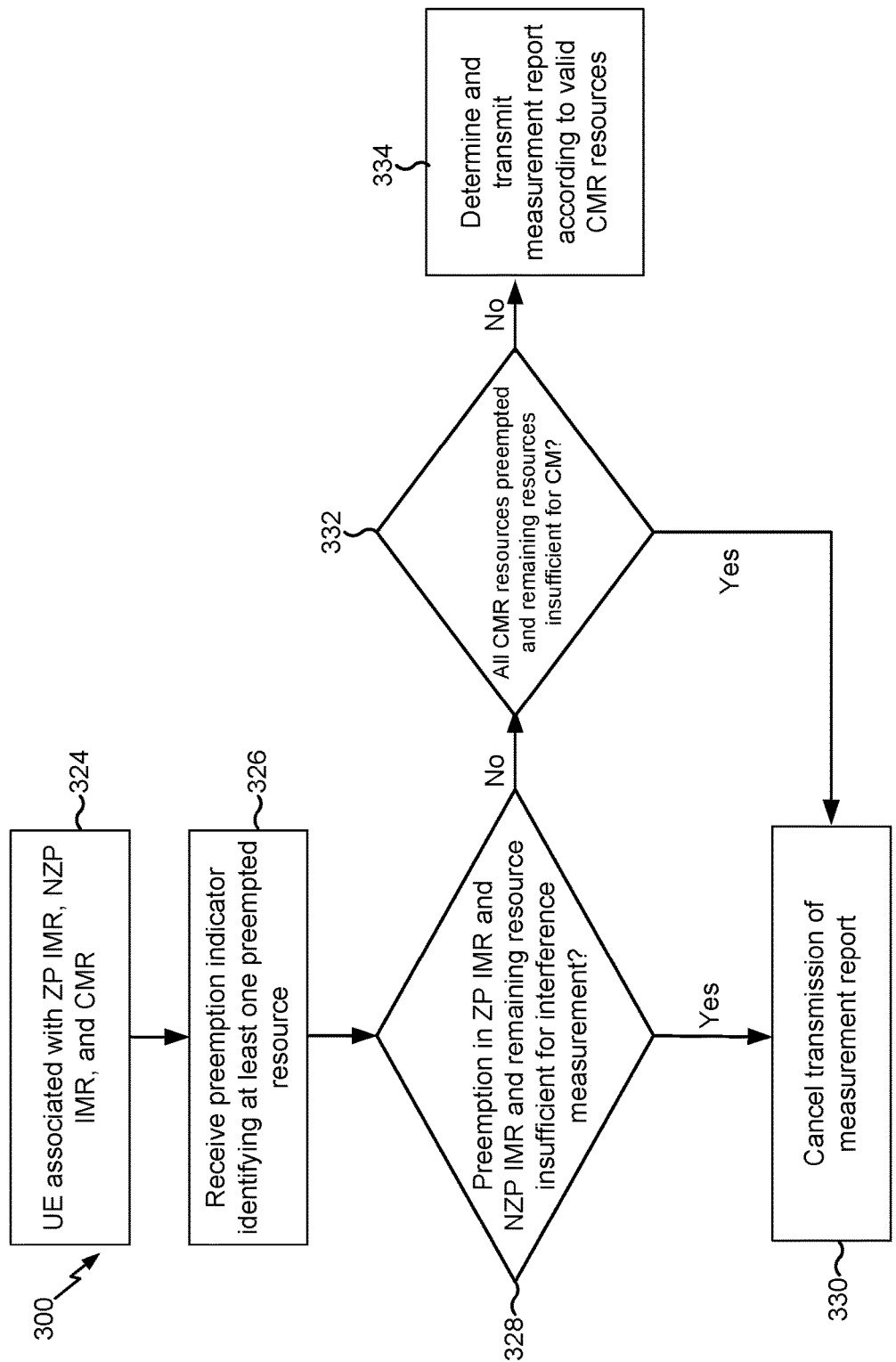

FIGS. 3A-3C are diagrams illustrating examples 300 of channel state determination with traffic preemption, in accordance with various aspects of the present disclosure. The operations described in connection with FIGS. 3A-3C may be performed by a UE, such as UE 120 and/or the UE described in connection with process 500 of FIG. 5.

As shown in FIG. 3A, and by reference number 302, the UE may be associated with one or more interference measurement resources (IMRs) and one or more channel measurement resources (CMRs). In some aspects, the one or more IMRs may include a zero-power IMR (ZP IMR) and a non-zero-power IMR (NZP IMR). In some aspects, the one or more CMRs may include a NZP CSI reference signal (NZP CSI-RS). In some aspects, the UE may be associated with one or more CMRs only. In some aspects, the UE may be associated with one or more CMRs, an NZP IMR, a ZP IMR, or a combination thereof.

The UE may be configured to report channel state information (CSI) (e.g., a CSI-RS resource indication, a reference signal received power, and/or the like) with regard to the CMR and with regard to an NZP IMR-RS received in the NZP IMR. For example, the CMR may be associated with a CMR resource setting of one or more CSI-RS resources. One of the CSI-RS resources may be an active CSI-RS resource set on which the CSI-RS is to be received by the UE. The IMR can be a NZP CSI-RS resource set, a ZP IMR, and/or a combination thereof. The various resources described above may be termed measurement reference resources.

As shown by reference number 304, the UE may receive a preemption indicator. The preemption indicator may be associated with low-latency traffic (e.g., URLLC traffic), and may identify one or more resources that are to be preempted for the low-latency traffic. The techniques and apparatuses described herein are relevant when at least one measurement reference resource is to be preempted. As used herein, a measurement reference resource that is not preempted may be termed a valid measurement reference resource.

As shown by reference number 306, the UE may determine whether the preemption is to occur in the IMR or the CMR. For example, the UE may determine whether any one or more of the ZP IMR, the NZP IMR, or the CMR is to be preempted by the low-latency traffic. When the preemption is to occur in the IMR or the CMR (reference number 306—YES), then the UE may cancel transmission of the measurement report, as shown by reference number 308. For example, since at least one of the IMR or the CMR is preempted, the UE may not determine the measurement report (e.g., on the assumption that accuracy of the measurement report would be impacted by the preemption), thereby saving resources that would otherwise be used to determine the measurement report. In some aspects, the measurement report may include a CSI and/or the like.

When the UE determines that preemption has not occurred in the IMR or the CMR (reference number 306—NO), then the UE may determine and transmit a measurement report, as shown by referenced number 310. For example, the UE may determine and transmit the measurement report based at least in part on the IMR and/or the CMR. In this way, the UE determines the measurement report on the assumption that the preemption does not affect accuracy of the measurement report, since the at least one measurement reference resource is not to be preempted. Thus, processor resources are conserved in comparison to determining whether to transmit the measurement report using a more complicated technique.

FIG. 3B is an example wherein the UE determines whether to transmit a measurement report based at least in part on whether all CMRs are preempted. As shown in FIG. 3B, and by reference number 312, the UE may be associated with measurement reference resources including a ZP IMR, an NZP IMR, and one or more CMRs. As shown by reference number 314, the UE may receive a preemption indicator identifying at least one preempted resource.

As shown by reference number 316, the UE may determine whether preemption has occurred in the ZP IMR and the NZP IMR. For example, the UE may determine whether the ZP IMR and the NZP IMR have been preempted as the at least one preempted resource. When the ZP IMR and the NZP IMR have been preempted (reference number 316—YES), then the UE may cancel transmission of the measurement report, as shown by reference number 318. For example, the UE may not determine and/or transmit the measurement report. In this way, the UE may conserve resources that would otherwise be used to transmit the measurement report, and may reduce an impact associated with transmitting an inaccurate or insufficient measurement report.

When at least one of the ZP IMR or the NZP IMR has not been preempted (reference number 316—NO), then the UE may determine whether all CMRs of the UE have been preempted, as shown by reference number 320. For example, the UE may determine whether there exists a non-preempted IMR, and, when a non-preempted IMR exists, the UE may determine whether there exists a non-preempted CMR.

When all CMRs of the UE are preempted (reference number 320—YES), then the UE may cancel transmission of the measurement report, as shown by reference number 318. When at least one CMR of the UE is not preempted (reference number 320—NO), then the UE may determine and transmit a measurement report according to one or more non-preempted CMRs. For example, the UE may determine and transmit a CSI-RS resource indication (CRI), a rank indicator (RI), a precoding matrix indicator (PMI), a channel quality indicator (CQI), a reference signal received power (RSRP), or a similar value, as the measurement report. If a measurement report (e.g., CRI, RI, PMI, CQI, RSRP, and/or the like) that is associated with a preempted resource is reported, a base station (e.g., BS 110) or receiving device may disregard the measurement report. In this way, the UE determines a measurement report based at least in part on at least one remaining CMR, thereby providing channel feedback when at least one CMR is not punctured.

FIG. 3C is an example wherein the UE determines and transmits a measurement report when sufficient measurement reference resources are not preempted (e.g., are valid). As shown in FIG. 3C, and by reference number 324, the UE may be associated with a ZP IMR, an NZP IMR, and at least one CMR. As shown by reference number 326, the UE may receive a preemption indicator identifying at least one preempted resource.

As shown by reference number 328, the UE may determine whether the ZP IMR and the NZP IMR are preempted and a remaining one or more measurement reference resources are sufficient to perform interference measurement. For example, the UE may determine if both IMR resources of the UE are preempted and if remaining measurement reference resources of the UE are sufficient to generate the measurement report. As used herein, a set of measurement reference resources may be sufficient to generate the measurement report when the set of measurement reference resources satisfy a threshold. For example, the threshold may be based at least in part on a bandwidth (e.g., a minimum allowable bandwidth for CSI-RS transmission) and/or whether the set of measurement reference resources are contiguous. When the set of measurement reference resources are contiguous and the minimum allowable bandwidth is satisfied, the set of measurement reference resources may be sufficient for performing measurement (e.g., interference measurement and/or channel measurement). In some aspects, the threshold may be configurable by a network associated with the UE.

When the ZP IMR and the NZP IMR are preempted, and when remaining resources of the UE are not sufficient for interference measurement (reference number 328—YES), then the UE may cancel transmission of the measurement report, as shown by reference number 330. For example, the UE may not determine or transmit the measurement report. When at least one of the ZP IMR or the NZP IMR is not preempted, or when the remaining resources of the UE are sufficient for interference measurement (reference number 328—NO), then the UE may determine whether all CMR resources are preempted and the remaining resources are insufficient for channel measurement, as shown by reference number 332. When all CMR resources are preempted and the remaining (e.g., valid) resources are insufficient for channel measurement (reference number 332—YES), then the UE may cancel transmission of the measurement report, as shown by reference number 330.

When not all CMR resources are preempted and the remaining resources are sufficient for channel measurement, then the UE may determine and transmit the measurement report according to valid CMR resources of the UE, as shown by reference number 334. For example, the UE may determine and/or transmit a measurement report including a CRI, a PMI, an RI, a CQI, an RSRP, and/or the like. In some aspects, the UE may determine the measurement report according to the non-preempted resources. For example, the measurement report may be associated with valid CSI-RS resources. As used herein, a valid CMR resource or valid CSI-RS resource includes a resource that is associated with a CRI, PMI, or CQI that corresponds to a non-preempted CMR resource. If the CRI, PMI, or CQI is associated with a punctured resource, then the case is regarded as invalid. In this way, the UE determines a measurement report based at least in part on non-preempted resources, which improves versatility of low-latency traffic and improves network operation with regard to measurement reporting.

As indicated above, FIGS. 3A-3C are provided as examples. Other examples are possible and may differ from what was described with respect to FIGS. 3A-3C.

Figure 4A:
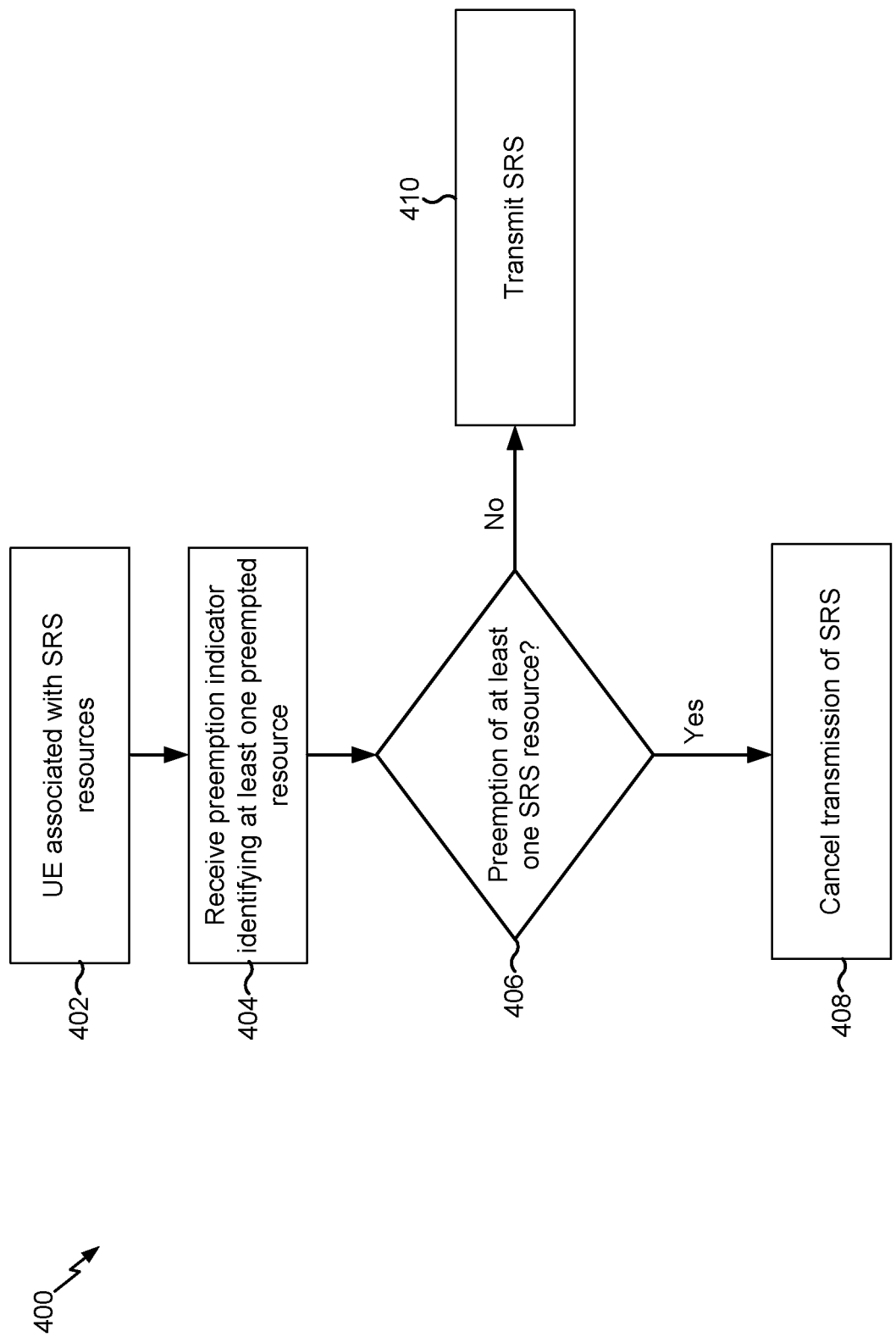
FIGS. 4A-4C are diagrams illustrating examples of reference signaling with traffic preemption, in accordance with various aspects of the present disclosure.
Figure 4B:
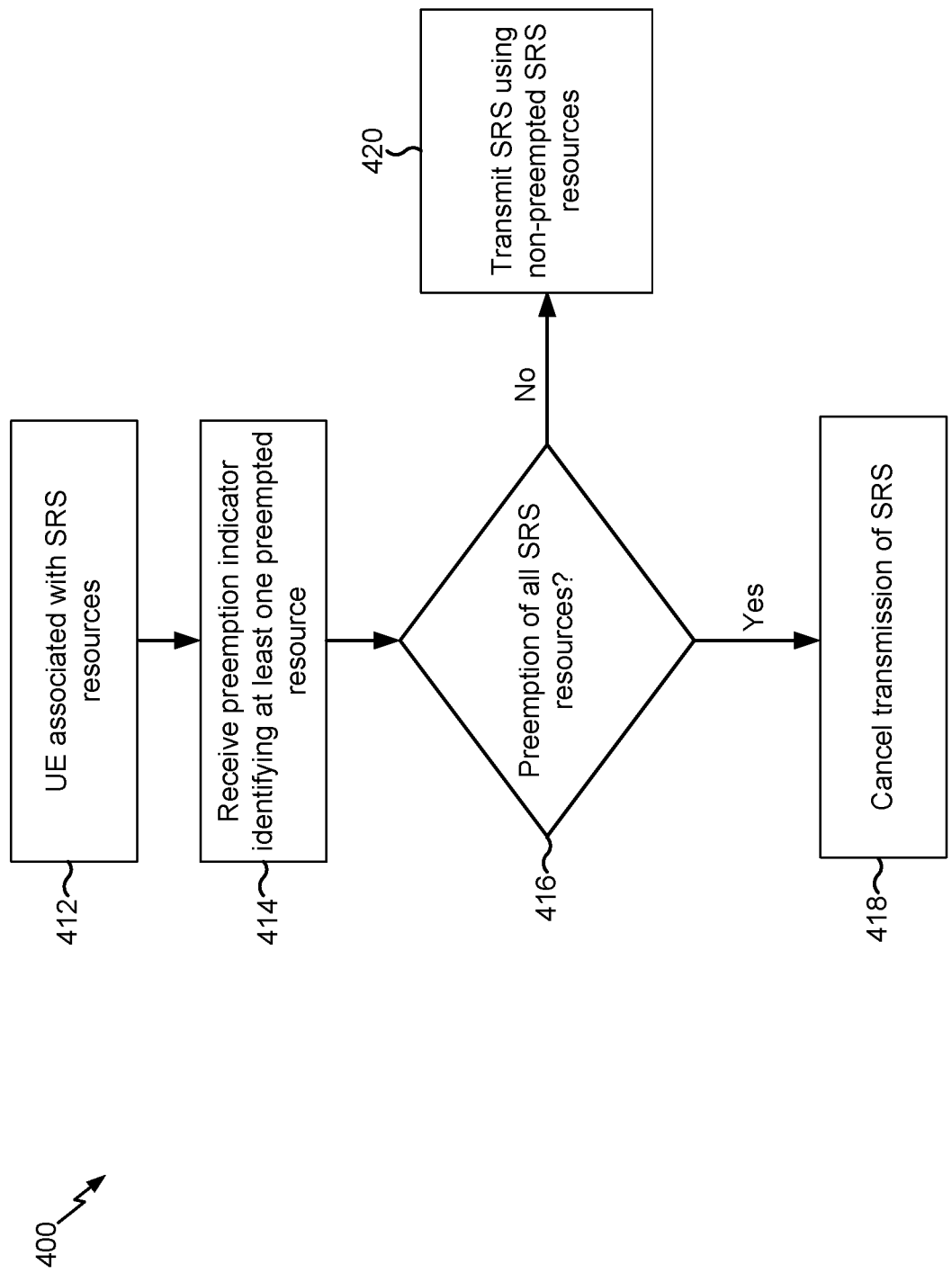
Figure 4C:
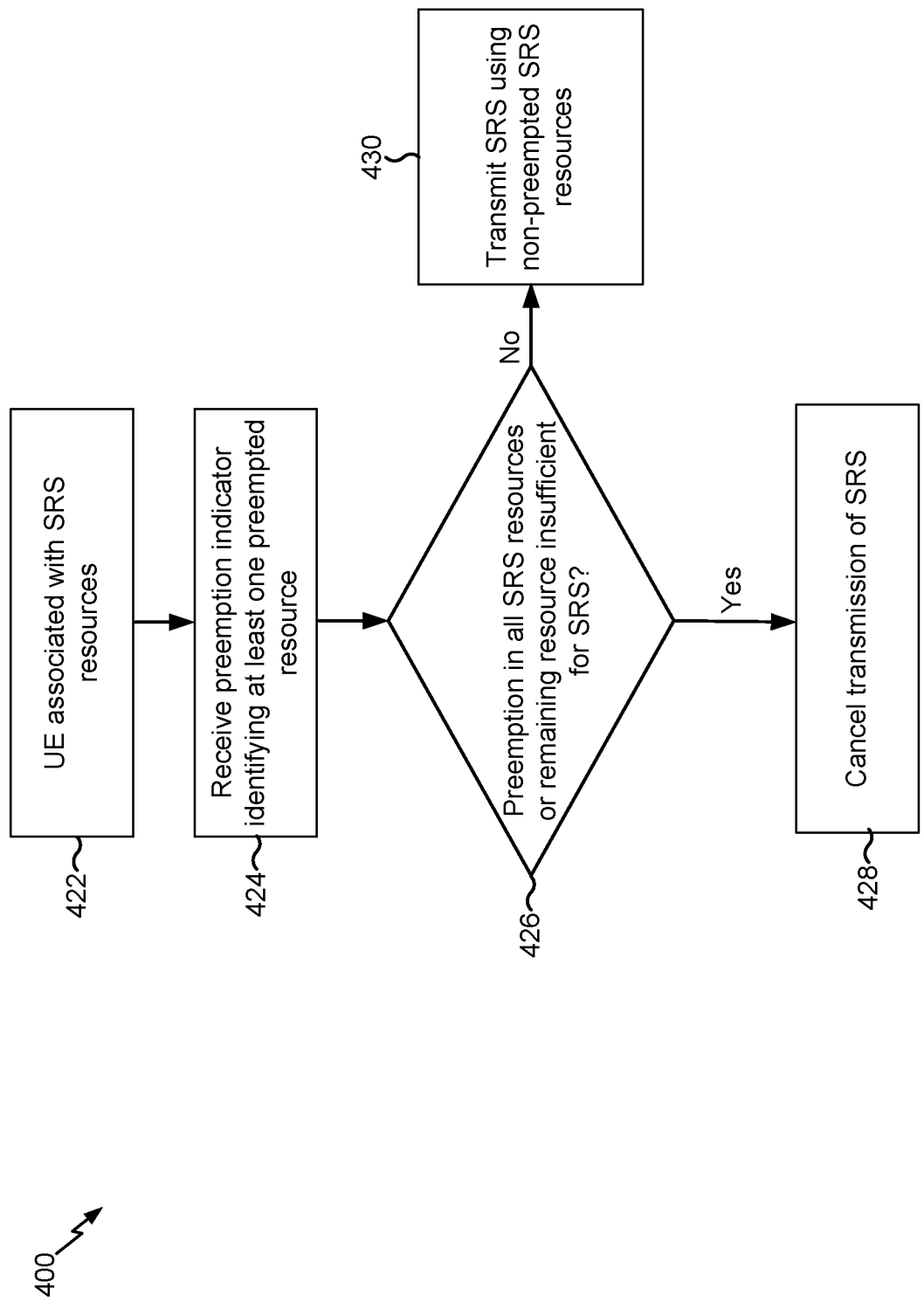

FIGS. 4A-4C are diagrams illustrating examples 400 of reference signaling with traffic preemption, in accordance with various aspects of the present disclosure. The operations described in connection with FIGS. 4A-4C may be performed by a UE, such as UE 120 and/or the UE described in connection with process 600 of FIG. 6.

As shown in FIG. 4A, and by reference number 402, the UE may be associated with SRS resources. In some aspects, the SRS resources may be referred to herein as uplink reference signal resources. An uplink reference signal resource may include a resource on which at least part of an uplink reference signal, such as an SRS, is to be transmitted. Each SRS resource may be transmitted in a particular band using a particular number of antenna ports. Different SRS resources can occupy different resource elements of a particular band and/or OFDM signal, or can be transmitted in the same resource elements of the same band using different OFDM symbols.

As shown by reference number 404, the UE may receive a preemption indicator identifying at least one preempted resource. In some aspects, the at least one preempted resource may include one or more of the SRS resources associated with the UE. As shown by reference number 406, the UE may determine whether at least one SRS resource of the SRS resources associated with the UE has been preempted. As shown by reference number 408, when at least one SRS resource associated with the UE has been preempted (reference number 406—YES), then the UE may cancel transmission of the uplink reference signal associated with the SRS resources (e.g., the SRS). For example, when any SRS resource of the SRS resources associated with the UE is preempted, the UE may not transmit the SRS, thereby saving transmission resources that would otherwise be used to transmit the SRS using insufficient SRS resources. When no SRS resource of the UE is preempted (reference number 406—NO), then the UE may transmit the SRS, as shown by reference number 410. This technique may use fewer processor resources in comparison to the techniques described in connection with FIGS. 4B and 4C.

FIG. 4B is an example wherein a UE transmits an uplink reference signal using non-preempted uplink reference signal resources. As shown in FIG. 4B, and by reference number 412, the UE may be associated with SRS resources, as described in more detail elsewhere herein. As shown by reference number 414, the UE may receive a preemption indicator identifying at least one preempted resource, as described in more detail elsewhere herein.

As shown by reference number 416, the UE may determine whether all resources of the SRS resources are preempted. If all SRS resources of the SRS resources are preempted (reference number 416—YES), then the UE may cancel transmission of the uplink reference signal (e.g., the SRS), as shown by reference number 418. For example, the UE may drop transmission of the uplink reference signal, thereby conserving transmission resources that would otherwise be used to transmit the SRS. If not all of the SRS resources are preempted (reference number 416—NO), then the UE may transmit the SRS using non-preempted SRS resources of the SRS resources associated with the UE, as shown by reference number 420. In some aspects, the UE may transmit the SRS based at least in part on a sounding resource indicator (SRI) or a transmitted precoding matrix indicator (TPMI). For example, the UE may expect to receive an SRI or TPMI associated with the non-preempted resources. When the UE receives an SRI or TPMI associated with a preempted resource, then the UE may determine that the SRI or TPMI is invalid, and may not transmit an SRS using the preempted resource, thereby conserving transmission resources that would otherwise be used to transmit the SRS.

FIG. 4C shows an example wherein at least a portion of the uplink reference signal is transmitted based at least in part on a threshold being satisfied with regard to a number of non-preempted resources. As shown in FIG. 4C, and by reference number 422, the UE may be associated with SRS resources, as described in more detail elsewhere herein. As shown by reference number 424, the UE may receive a preemption indicator identifying at least one preempted resource, as described in more detail elsewhere herein.

As shown by reference number 426, the UE may determine whether all SRS resources are preempted or a remaining number of SRS resources are insufficient for transmitting the SRS. For example, the UE may determine whether there are sufficient remaining resources after preemption to transmit the SRS, or whether all SRS resources of the SRS resources associated with the UE are preempted. As used herein, a set of uplink reference signal resources may be sufficient remaining resources when the set of uplink reference signal resources satisfies a threshold. For example, the threshold may be based at least in part on a bandwidth (e.g., a minimum allowable bandwidth for SRS transmission) and/or whether the set of uplink reference signal resources are contiguous in the frequency domain. When the set of uplink reference signal resources are contiguous and the minimum allowable bandwidth is satisfied, the set of uplink reference signal resources may be sufficient for transmitting an uplink reference signal (e.g., an SRS). In some aspects, the threshold may be configurable by a network or base station associated with the UE.

As shown by reference number 428, when all SRS resources are preempted, or when the remaining resources are not sufficient to transmit the SRS (reference number 426—NO), then the UE may cancel transmission of the SRS. For example, when the remaining resources do not satisfy the threshold associated with sufficient remaining resources, the UE may drop the transmission of the SRS. As shown by reference number 430, when not all SRS resources are preempted, and when there are sufficient remaining resources to transmit the SRS (reference number 426—YES), then the UE may transmit the SRS using the non-preempted SRS resources. In this way, the UE selectively transmits the SRS based at least in part on whether sufficient SRS resources are not preempted. This, in turn, improves SRS performance of the UE and reduces a likelihood that an unusable SRS is transmitted by the UE.

As indicated above, FIGS. 4A-4C are provided as examples. Other examples are possible and may differ from what was described with respect to FIGS. 4A-4C.

Figure 5:
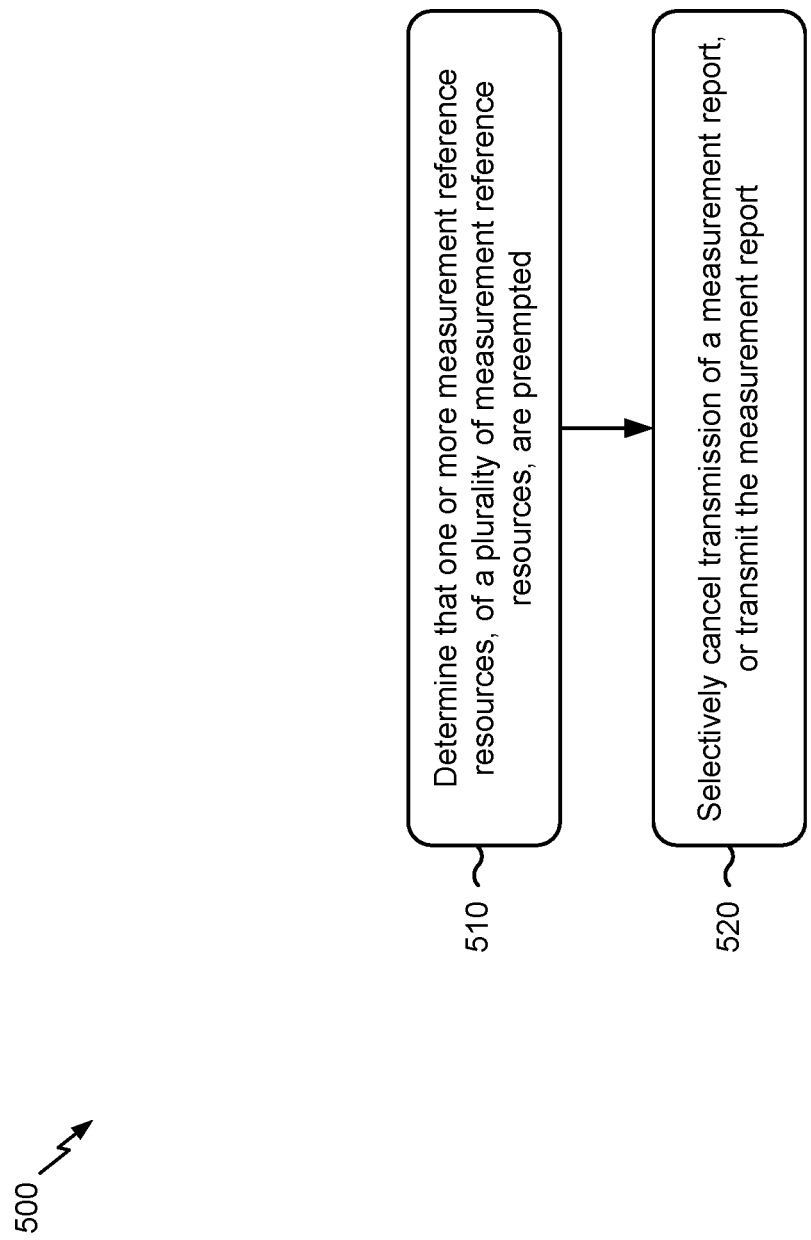
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs channel state determination with traffic preemption.

As shown in FIG. 5, in some aspects, process 500 may include determining that one or more measurement reference resources, of a plurality of measurement reference resources, are preempted (block 510). For example, the UE may determine (e.g., using controller/processor 280 and/or the like) that one or more measurement reference resources are preempted. The one or more measurement reference resources may be of a plurality of measurement reference resources associated with the UE. For example, the one or more measurement reference resources may include an IMR, a CMR, and/or the like.

As shown in FIG. 5, in some aspects, process 500 may include selectively canceling transmission of a measurement report, or transmitting the measurement report (block 520). For example, in some aspects, the UE may selectively cancel transmission of a measurement report or transmit the measurement report based at least in part on the determination of block 510. In some aspects, the UE may cancel (e.g., using controller/processor 280 and/or the like) transmission of the measurement report. In some aspects, the UE may transmit (e.g., using controller/processor 280, transmit processor 264, TX MIMO processor 266, MOD 254, antenna 252, and/or the like) the measurement report based at least in part on at least a portion of the plurality of measurement reference resources.

Process 500 may include additional aspects, such as any single aspect and/or any combination of aspects described below and/or in connection with one or more other processes described elsewhere herein.

In some aspects, the plurality of measurement reference resources comprises at least one non-zero-power (NZP) Channel State Information reference signal (CSI-RS) resource for channel measurement. In some aspects, transmitting the measurement report is based at least in part on determining that there exists at least one valid NZP CSI-RS resource for a channel measurement resource (CMR). In some aspects, the measurement report comprises at least one of CSI-RS resource indication (CRI) or a reference signal receive power (RSRP), and the measurement report is associated with the at least one valid NZP CSI-RS resource for the CMR. In some aspects, canceling transmission of the measurement report is based at least in part on determining that there is no valid NZP CSI-RS resources for a channel measurement resource (CMR).

In some aspects, the plurality of measurement reference resources further comprises at least one interference measurement resource (IMR), wherein the at least one IMR comprises at least one of a NZP CSI-RS IMR or a zero-power (ZP) IMR. In some aspects, transmitting the measurement report is based at least in part on determining that there exists at least one valid NZP CSI-RS resource for a channel measurement resource (CMR) and determining that there exists a valid IMR.

In some aspects, canceling the transmission of the measurement report is based at least in part on determining that there are no valid NZP CSI-RS resources for a channel measurement resource (CMR) or determining that there exists no valid IMR. In some aspects, the measurement report comprises at least one of a CSI-RS resource indicator (CRI), a rank indicator (RI), a precoding matrix indicator (PMI), or a channel quality indicator (CQI), and the measurement report is associated with the at least one valid NZP CSI-RS resource for the CMR or the valid IMR. In some aspects, the at least one valid NZP CSI-RS resource for the CMR comprises non-preempted NZP CSI-RS resources for the CMR. In some aspects, the at least one valid NZP CSI-RS for the CMR further comprises preempted NZP CSI-RS resources with sufficient remaining resources after preemption.

In some aspects, the sufficient remaining resources after preemption satisfy a threshold configured by a network. In some aspects, the sufficient remaining resources after preemption are contiguous in a frequency domain, and satisfy a threshold with regard to a minimum allowable bandwidth. In some aspects, the valid IMR is a non-preempted NZP CSI-RS resource for interference measurement, or a non-preempted ZP IMR. In some aspects, the sufficient remaining resources after preemption further comprise sufficient slots in a time domain, if the preempted NZP CSI-RS resources are periodic or semi-persistent. In some aspects, the valid IMR further comprises a preempted NZP CSI-RS resource for interference measurement with sufficient remaining resources after preemption, a preempted ZP IMR with sufficient remaining resources after preemption, or a combination thereof. In some aspects, the sufficient remaining resources after preemption are contiguous in a frequency domain and satisfies a threshold with regard to a minimum allowable bandwidth. In some aspects, the threshold is configurable by a network. In some aspects, the sufficient remaining resources after preemption further comprise sufficient slots in a time domain, if the preempted ZP IMR is periodic or semi-persistent.

In some aspects, the plurality of measurement reference resources comprise at least one non-zero-power (NZP) channel state information reference signal (CSI-RS) resource for channel measurement. In some aspects, transmitting the measurement report is based at least in part on determining that the at least one NZP CSI-RS resource includes at least one valid NZP CSI-RS resource for a channel measurement resource (CMR). In some aspects, the measurement report indicates at least one of a CSI-RS resource indication (CRI) or a reference signal receive power (RSRP); and the measurement report is associated with the at least one valid NZP CSI-RS resource for the CMR.

In some aspects, the at least one valid NZP CSI-RS resource for the CMR comprises non-preempted NZP CSI-RS resources for the CMR. In some aspects, the at least one valid NZP CSI-RS resource for the CMR comprises preempted NZP CSI-RS resources and sufficient remaining resources after preemption for the NZP CSI-RS In some aspects, the UE may receive or determine information identifying a threshold; and determine that the at least one valid NZP CSI-RS resource for the CMR includes the sufficient remaining resources after preemption based at least in part on the threshold. In some aspects, the sufficient remaining resources are contiguous in a frequency domain and have a bandwidth greater than or equal to a minimum allowable bandwidth. In some aspects, the sufficient remaining resources comprise a threshold number of slots in a time domain if the preempted NZP CSI-RS resources are periodic or semi-persistent.

In some aspects, canceling transmission of the measurement report is based at least in part on determining that no NZP CSI-RS resource, of the at least one NZP CSI-RS resource, is a valid NZP CSI-RS resource for a channel measurement resource (CMR). In some aspects, the plurality of measurement reference resources further comprise at least one interference measurement resource (IMR), wherein the at least one IMR comprises at least one of a NZP CSI-RS IMR or a zero-power (ZP) IMR.

In some aspects, transmitting the measurement report is based at least in part on determining that the at least one NZP CSI-RS resource includes a valid NZP CSI-RS resource for a channel measurement resource (CMR), and based at least in part on determining that the at least one IMR comprises a valid IMR for the measurement resource. In some aspects, the valid IMR is a non-preempted NZP CSI-RS resource for interference measurement or a non-preempted ZP IMR. In some aspects, the valid IMR further comprises: a preempted NZP CSI-RS resource for interference measurement with sufficient remaining resources after preemption for the at least one IMR, a preempted ZP IMR with sufficient remaining resources after preemption for the at least one IMR, or a combination thereof.

In some aspects, the UE may receive or determine information identifying a threshold; and determine the sufficient remaining resources after preemption based at least in part on the threshold. In some aspects, the valid IMR is associated with sufficient remaining resources after preemption when the valid IMR is contiguous in a frequency domain and has a bandwidth greater than or equal to a minimum allowable bandwidth. In some aspects, canceling the transmission of the measurement report is based at least in part on determining that the at least one NZP CSI-RS resource does not include a valid NZP-CSI RS resource for a channel measurement resource (CMR), or determining that the at least one IMR does not include a valid IMR. In some aspects, the measurement report comprises at least one of: a CSI-RS resource indicator (CRI), a rank indicator (RI), a precoding matrix indicator (PMI), or a channel quality indicator (CQI); and the measurement report is associated with the valid NZP CSI-RS resource for the CMR or the valid IMR.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
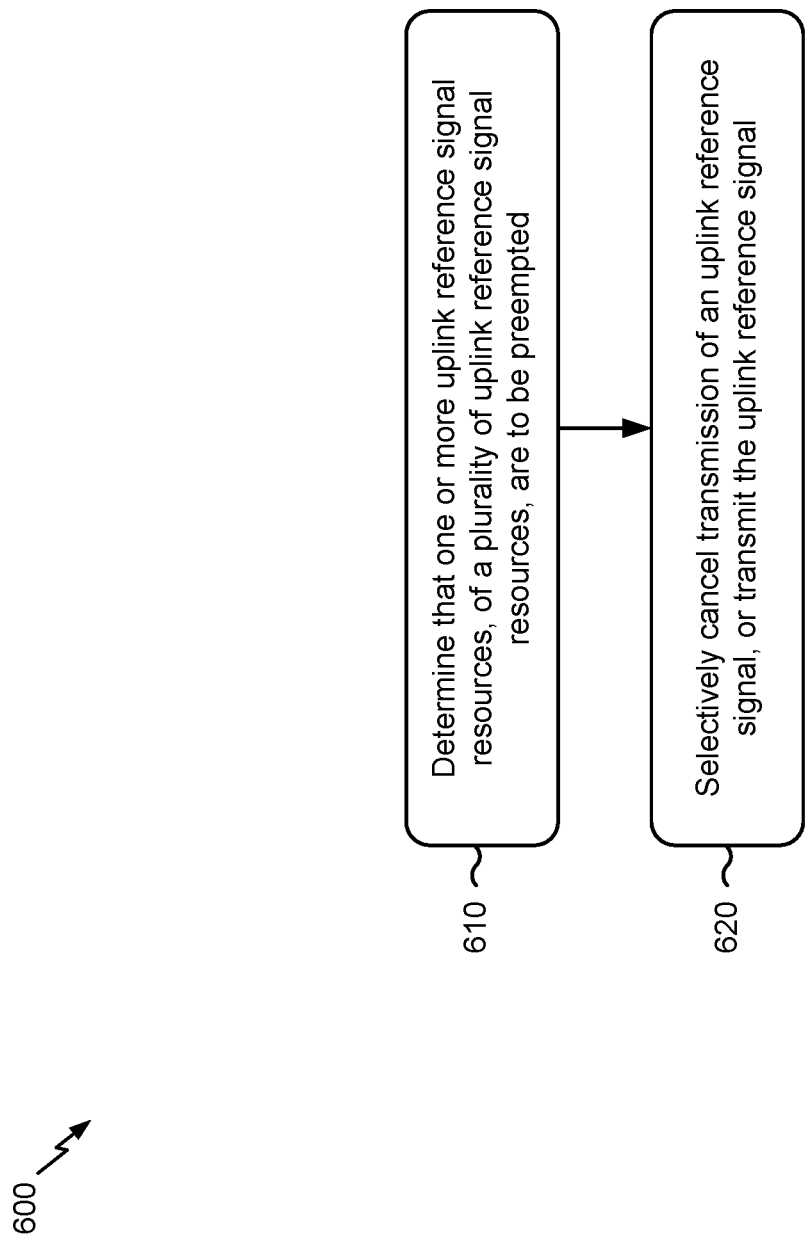
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs reference signaling with traffic preemption.

As shown in FIG. 6, in some aspects, process 600 may include determining that one or more uplink reference signal resources, of a plurality of uplink reference signal resources, are to be preempted (block 610). For example, the UE may determine (e.g., using controller/processor 280 and/or the like) that one or more uplink reference signal resources, of a plurality of uplink reference signal resources, are to be preempted. In some aspects, the UE may determine that the one or more uplink reference signal resources are preempted.

As shown in FIG. 6, in some aspects, process 600 may include selectively canceling transmission of an uplink reference signal, or transmitting the uplink reference signal (block 620). For example, the UE may cancel transmission of the uplink reference signal or transmit the uplink reference signal based at least in part on the determination at block 610. In some aspects, the UE may cancel (e.g., using controller/processor 280 and/or the like) transmission of the uplink reference signal. In some aspects, the UE may transmit (e.g., using controller/processor 280, transmit processor 264, TX MIMO processor 266, MOD 254, antenna 252, and/or the like) the uplink reference signal based at least in part on at least a portion of the plurality of uplink reference signal resources based at least in part on the determination.

Process 600 may include additional aspects, such as any single aspect and/or any combination of aspects described below and/or in connection with one or more other processes described elsewhere herein.

In some aspects, the uplink reference signal comprises one or more sounding reference signals (SRSs). In some aspects, transmitting the uplink reference signal is based at least in part on determining that there exists at least one valid uplink reference signal resource. In some aspects, canceling transmission of the uplink reference signal is based at least in part on determining that there is not at least one valid uplink reference signal resource.

In some aspects, the UE may receive one or more sounding resource indicators (SRIs) from a base station, wherein the one or more SRIs are associated with a valid uplink reference signal resource. When the one or more SRIs are not associated with the valid uplink reference signal resource, the UE is configured to determine that there is not the at least one valid uplink reference signal resource.

In some aspects, the at least one valid uplink reference signal resource comprises non-preempted uplink reference signal resources. In some aspects, the at least one valid uplink reference signal resources further comprises at least one preempted uplink reference signal resource with sufficient remaining resources after preemption. In some aspects, the sufficient remaining resources after preemption are contiguous in a frequency domain and satisfy a threshold with regard to a minimum allowable bandwidth. In some aspects, the sufficient remaining resources after preemption further comprise sufficient slots in a time domain, if the at least one preempted uplink reference signal resource is periodic or semi-persistent. In some aspects, the threshold is configured by a network.

In some aspects, the uplink reference signal comprises one or more sounding reference signals (SRS). In some aspects, transmitting the uplink reference signal is based at least in part on determining that the plurality of uplink reference signal resources includes at least one valid uplink reference signal resource after preemption. In some aspects, the at least one valid uplink reference signal resource comprises non-preempted uplink reference signal resources. In some aspects, the at least one valid uplink reference signal resource further comprises at least one preempted uplink reference signal resource and sufficient remaining resources after preemption for determination of the uplink reference signal. In some aspects, the sufficient remaining resources are contiguous in a frequency domain and are greater than or equal to a minimum allowable bandwidth. In some aspects, the UE may receive or determine information identifying a threshold; and determine whether the plurality of uplink reference signal resources include the sufficient remaining resources based at least in part on the threshold.

In some aspects, canceling transmission of the uplink reference signal is based at least in part on determining that the plurality of uplink reference signal resources does not include a valid uplink reference signal resource after preemption. In some aspects, the UE may receive one or more sounding resource indicators (SRIs) from a base station, wherein the one or more SRIs are associated with or identify the valid uplink reference signal resource. In some aspects, the UE may receive one or more SRIs that are not associated with or do not identify the valid uplink reference signal resource; and determine that the one or more SRIs are not valid.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
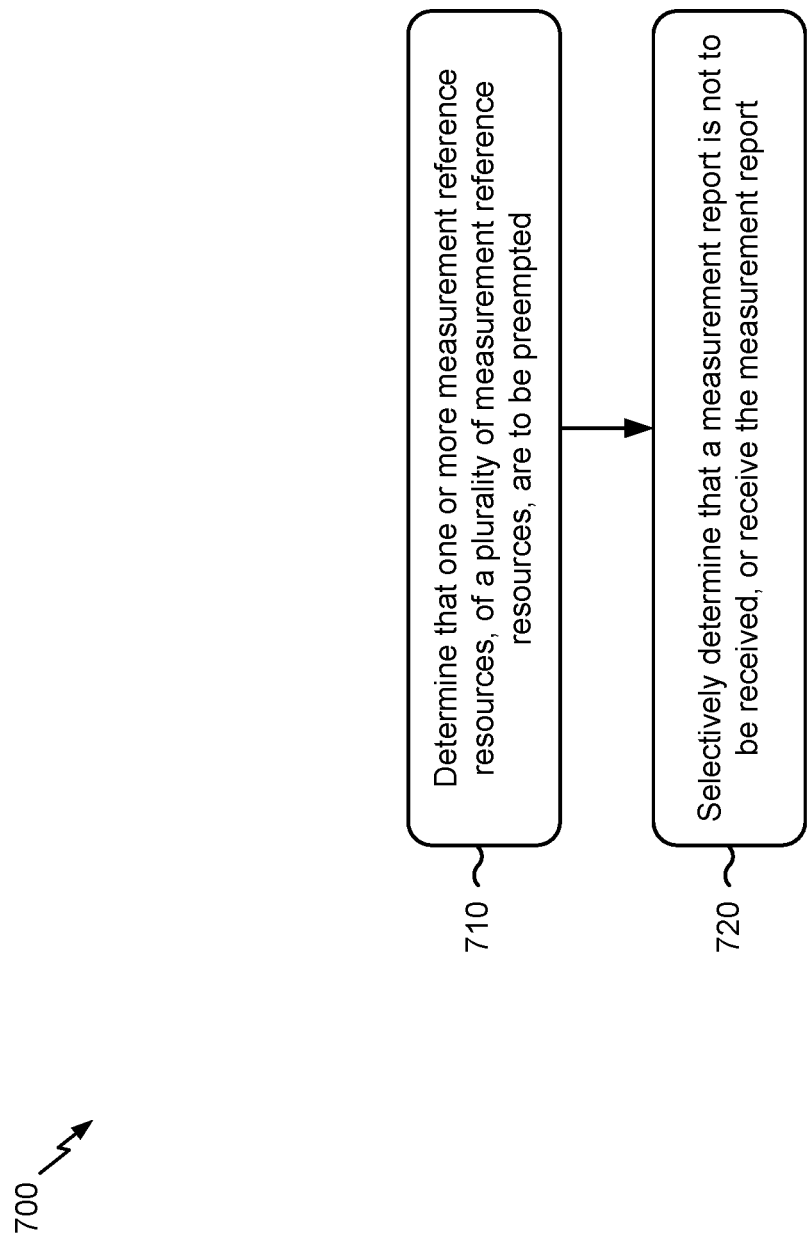
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110) performs channel state determination with traffic preemption.

As shown in FIG. 7, in some aspects, process 700 may include determining that one or more measurement reference resources, of a plurality of measurement reference resources, are preempted (block 710). For example, the base station may determine (e.g., using controller/processor 240 and/or the like) that one or more measurement reference resources are preempted. The one or more measurement reference resources may be of a plurality of measurement reference resources associated with a UE. For example, the one or more measurement reference resources may include an IMR, a CMR, and/or the like.

As shown in FIG. 7, in some aspects, process 700 may include selectively determining that a measurement report is not to be received, or receiving the measurement report (block 720). For example, in some aspects, the base station may selectively determine that a measurement report is not to be received or receive the measurement report based at least in part on the determination of block 710. In some aspects, the base station may determine (e.g., using controller/processor 240 and/or the like) that the measurement report is not to be transmitted. In some aspects, the base station may receive (e.g., using controller/processor 240, antenna 234, DEMOD 232, MIMO detector 236, receive processor 238, and/or the like) the measurement report based at least in part on at least a portion of the plurality of measurement reference resources.

Process 700 may include additional aspects, such as any single aspect and/or any combination of aspects described below and/or in connection with one or more other processes described elsewhere herein.

In some aspects, the plurality of measurement reference resources comprises at least one non-zero-power (NZP) Channel State Information reference signal (CSI-RS) resource for channel measurement. In some aspects, receiving the measurement report is based at least in part on determining that there exists at least one valid NZP CSI-RS resource for a channel measurement resource (CMR). In some aspects, the measurement report comprises at least one of CSI-RS resource indication (CRI) or a reference signal receive power (RSRP), and the measurement report is associated with the at least one valid NZP CSI-RS resource for the CMR. In some aspects, determining that the measurement report is not be received is based at least in part on determining that there is no valid NZP CSI-RS resources for a channel measurement resource (CMR).

In some aspects, the plurality of measurement reference resources further comprises at least one interference measurement resource (IMR), wherein the at least one IMR comprises at least one of a NZP CSI-RS IMR or a zero-power (ZP) IMR. In some aspects, receiving the measurement report is based at least in part on determining that there exists at least one valid NZP CSI-RS resource for a channel measurement resource (CMR) and determining that there exists a valid IMR.

In some aspects, determining that the measurement report is not to be received is based at least in part on determining that there are no valid NZP CSI-RS resources for a channel measurement resource (CMR) or determining that there exists no valid IMR. In some aspects, the measurement report comprises at least one of a CSI-RS resource indicator (CRI), a rank indicator (RI), a precoding matrix indicator (PMI), or a channel quality indicator (CQI), and the measurement report is associated with the at least one valid NZP CSI-RS resource for the CMR or the valid IMR. In some aspects, the at least one valid NZP CSI-RS resource for the CMR comprises non-preempted NZP CSI-RS resources for the CMR. In some aspects, the at least one valid NZP CSI-RS for the CMR further comprises preempted NZP CSI-RS resources with sufficient remaining resources after preemption.

In some aspects, the sufficient remaining resources after preemption satisfy a threshold configured by the base station. In some aspects, the sufficient remaining resources after preemption are contiguous in a frequency domain, and satisfy a threshold with regard to a minimum allowable bandwidth. In some aspects, the valid IMR is a non-preempted NZP CSI-RS resource for interference measurement, or a non-preempted ZP IMR. In some aspects, the sufficient remaining resources after preemption further comprise sufficient slots in a time domain, if the preempted NZP CSI-RS resources are periodic or semi-persistent. In some aspects, the valid IMR further comprises a preempted NZP CSI-RS resource for interference measurement with sufficient remaining resources after preemption, a preempted ZP IMR with sufficient remaining resources after preemption, or a combination thereof. In some aspects, the sufficient remaining resources after preemption are contiguous in a frequency domain and satisfies a threshold with regard to a minimum allowable bandwidth. In some aspects, the threshold is configurable by the base station. In some aspects, the sufficient remaining resources after preemption further comprise sufficient slots in a time domain, if the preempted ZP IMR is periodic or semi-persistent.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
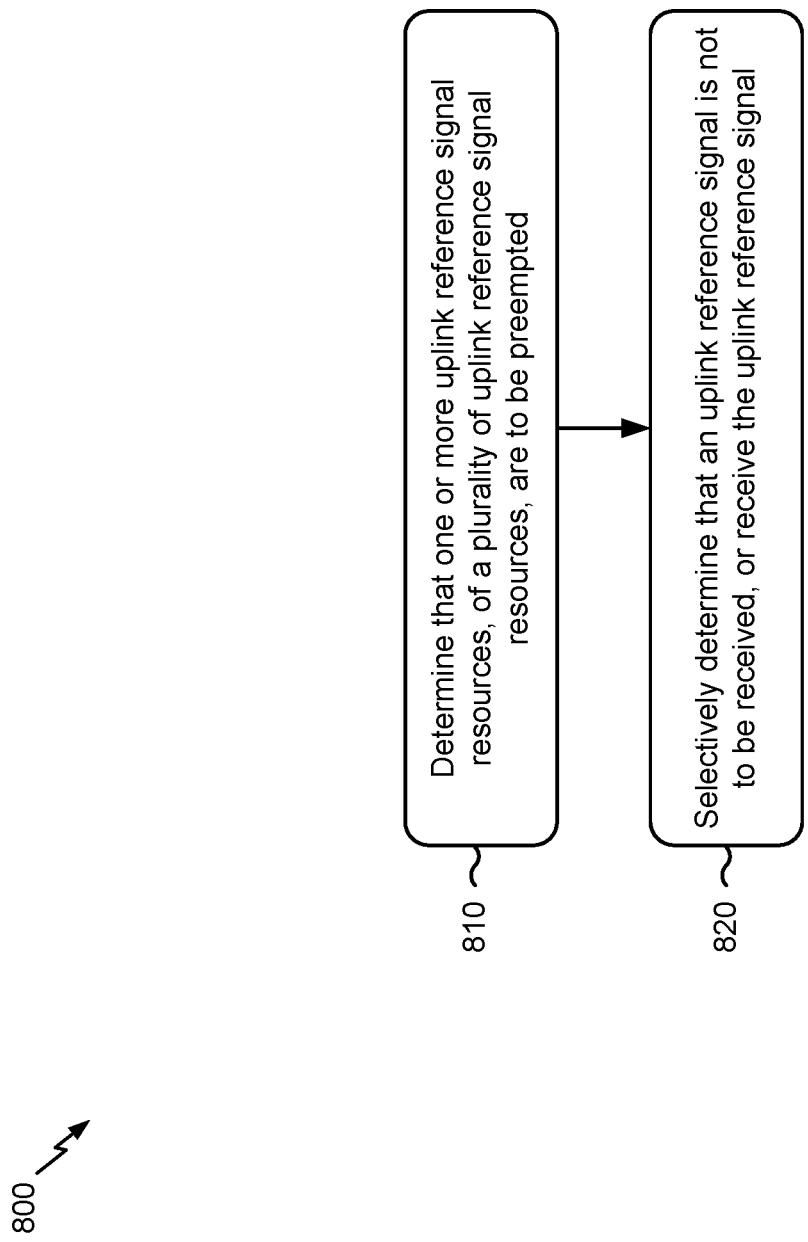
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where a base station (e.g., BS 110) performs reference signaling with traffic preemption.

As shown in FIG. 8, in some aspects, process 800 may include determining that one or more uplink reference signal resources, of a plurality of uplink reference signal resources, are to be preempted (block 810). For example, the base station may determine (e.g., using controller/processor 240 and/or the like) that one or more uplink reference signal resources, of a plurality of uplink reference signal resources, are to be preempted. In some aspects, the base station may determine that the one or more uplink reference signal resources are preempted.

As shown in FIG. 8, in some aspects, process 800 may include selectively determining that an uplink reference signal is not to be received, or receiving the uplink reference signal (block 820). For example, the base station may determine that the uplink reference signal is not to be received or may receive the uplink reference signal based at least in part on the determination at block 810. In some aspects, the base station may determine (e.g., using controller/processor 240 and/or the like) that the uplink reference signal is not to be received. In some aspects, the base station may receive (e.g., using controller/processor 240, antenna 234, DEMOD 232, MIMO detector 236, receive processor 238, and/or the like) the uplink reference signal based at least in part on at least a portion of the plurality of uplink reference signal resources based at least in part on the determination.

Process 800 may include additional aspects, such as any single aspect and/or any combination of aspects described below and/or in connection with one or more other processes described elsewhere herein.

In some aspects, the uplink reference signal comprises one or more sounding reference signals (SRSs). In some aspects, receiving the uplink reference signal is based at least in part on determining that there exists at least one valid uplink reference signal resource. In some aspects, determining that the uplink reference signal is not to be received is based at least in part on determining that there is not at least one valid uplink reference signal resource.

In some aspects, the base station may transmit one or more sounding resource indicators (SRIs) from a base station, wherein the one or more SRIs are associated with a valid uplink reference signal resource.

In some aspects, the at least one valid uplink reference signal resource comprises non-preempted uplink reference signal resources. In some aspects, the at least one valid uplink reference signal resources further comprises at least one preempted uplink reference signal resource with sufficient remaining resources after preemption. In some aspects, the sufficient remaining resources after preemption are contiguous in a frequency domain and satisfy a threshold with regard to a minimum allowable bandwidth. In some aspects, the sufficient remaining resources after preemption further comprise sufficient slots in a time domain, if the at least one preempted uplink reference signal resource is periodic or semi-persistent. In some aspects, the base station may determine the sufficient remaining resources after preemption based at least in part on a threshold; and transmit information identifying the threshold to a user equipment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that one or more channel state information reference signal (CSI-RS) resources, of a plurality of CSI-RS resources, are preempted;
    determining, based at least in part on a threshold, whether a remaining portion of the plurality of CSI-RS resources includes sufficient non-zero power (NZP) CSI-RS resources for the NZP CSI-RS; and
    based at least in part on determining whether the remaining portion includes the sufficient NZP CSI-RS resources, selectively:
        canceling transmission of channel state information (CSI), or
        transmitting the CSI based at least in part on the remaining portion.

2. The method of claim 1, wherein the plurality of CSI-RS resources comprise at least one NZP CSI-RS resource for channel measurement.

3. The method of claim 2, wherein transmitting the CSI is based at least in part on determining that the sufficient NZP CSI-RS resources include at least one valid NZP CSI-RS resource for a channel measurement resource (CMR).

4. The method of claim 3, wherein the CSI indicates at least one of a CSI-RS resource indication (CRI) or a reference signal receive power (RSRP); and
    wherein the CSI is associated with the at least one valid NZP CSI-RS resource for the CMR.

5. The method of claim 3, wherein the at least one valid NZP CSI-RS resource for the CMR comprises non-preempted NZP CSI-RS resources for the CMR.

6. The method of claim 5, wherein the at least one valid NZP CSI-RS resource for the CMR comprises preempted NZP CSI-RS resources and the sufficient remaining resources.

7. The method of claim 6, wherein the method further comprises:
    receiving or determining information identifying the threshold.

8. The method of claim 1, wherein the sufficient remaining resources are contiguous in a frequency domain, and have a bandwidth greater than or equal to a minimum allowable bandwidth.

9. The method of claim 1, wherein the sufficient remaining resources comprise a threshold number of slots in a time domain if the plurality of CSI-RS resources are periodic or semi-persistent.

10. The method of claim 2, wherein canceling transmission of the CSI is based at least in part on determining that no NZP CSI-RS resource, of the at least one NZP CSI-RS resource, is a valid NZP CSI-RS resource for a channel measurement resource (CMR).

11. The method of claim 2, wherein the plurality of CSI-RS resources further comprise at least one interference measurement resource (IMR), wherein the at least one IMR comprises at least one of a NZP CSI-RS IMR or a zero-power (ZP) IMR.

12. The method of claim 11, wherein transmitting the CSI is based at least in part on determining that the at least one NZP CSI-RS resource includes a valid NZP CSI-RS resource for a channel measurement resource (CMR), and based at least in part on determining that the at least one IMR comprises a valid IMR for the measurement resource.

13. The method of claim 12, wherein the valid IMR is a non-preempted NZP CSI-RS resource for interference measurement or a non-preempted ZP IMR.

14. The method of claim 12, wherein the valid IMR further comprises:
    a preempted NZP CSI-RS resource for interference measurement with sufficient remaining resources after preemption for the at least one IMR,
    a preempted ZP IMR with sufficient remaining resources after preemption for the at least one IMR, or
    a combination thereof.

15. The method of claim 14, wherein the valid IMR is associated with the sufficient remaining resources after preemption when the valid IMR is contiguous in a frequency domain and has a bandwidth greater than or equal to a minimum allowable bandwidth.

16. The method of claim 11, wherein canceling the transmission of the CSI is based at least in part on determining that the at least one NZP CSI-RS resource does not include a valid NZP CSI-RS resource for a channel measurement resource (CMR), or determining that the at least one IMR does not include a valid IMR.

17. The method of claim 16, wherein the CSI comprises at least one of:
    a CSI-RS resource indicator (CRI),
    a rank indicator (RI),
    a precoding matrix indicator (PMI), or
    a channel quality indicator (CQI); and
        wherein the CSI is associated with the valid NZP CSI-RS resource for the CMR or the valid IMR.

18. A method of wireless communication performed by a user equipment (UE), comprising:
    determining that one or more sounding reference signal (SRS) resources, of a plurality of SRS resources, are to be preempted;

determining, based at least in part on a threshold, whether a remaining portion of the plurality of SRS resources includes sufficient remaining resources for an uplink reference signal; and based at least in part on determining whether the remaining portion includes the sufficient remaining resources, selectively:
canceling transmission of the uplink reference signal, or
transmitting the uplink reference signal based at least in part on at least a portion of the plurality of SRS resources.

19. The method of claim 18, wherein the uplink reference signal comprises one or more sounding reference signals (SRS).

20. The method of claim 18, wherein transmitting the uplink reference signal is based at least in part on determining that the plurality of SRS resources includes at least one valid uplink reference signal resource after preemption.

21. The method of claim 20, wherein the at least one valid uplink reference signal resource comprises non-preempted uplink reference signal resources.

22. The method of claim 20, wherein the at least one valid uplink reference signal resource further comprises at least one preempted uplink reference signal resource and the sufficient remaining resources.

23. The method of claim 22, wherein the sufficient remaining resources are contiguous in a frequency domain and have a bandwidth greater than or equal to a minimum allowable bandwidth.

24. The method of claim 18, wherein canceling transmission of the uplink reference signal is based at least in part on determining that the plurality of SRS resources does not include a valid uplink reference signal resource after preemption.

25. The method of claim 24, further comprising:
receiving one or more sounding resource indicators (SRIs) from a base station, wherein the one or more SRIs are associated with or identify the valid uplink reference signal resource.

26. The method of claim 25, further comprising:
receiving one or more SRIs that are not associated with or do not identify the valid uplink reference signal resource; and
determining that the one or more SRIs are not valid.

27. A method of wireless communication performed by a base station, comprising:

determining that one or more channel state information reference signal (CSI-RS) resources, of a plurality of CSI-RS resources associated with a user equipment (UE), are to be preempted;

determining, based at least in part on a threshold, whether a remaining portion of the plurality of CSI-RS resources includes sufficient non-zero power (NZP) CSI-RS resources for the NZP CSI-RS; and based at least in part on determining whether the remaining portion includes the sufficient NZP CSI-RS resources, selectively:
canceling transmission of at least one measurement reference signal associated with the CSI-RS resources, or
transmitting, to the UE, the at least one measurement reference signal with regard to the remaining portion.

28. A method of wireless communication performed by a base station, comprising:
determining that one or more sounding reference signal (SRS) resources, of a plurality of SRS resources associated with a user equipment (UE), are to be preempted; and
determining, based at least in part on a threshold, whether a remaining portion of the plurality of SRS resources includes sufficient remaining resources for an uplink reference signal; and
based at least in part on determining whether the remaining portion includes the sufficient remaining resources, selectively:
determining that an uplink reference signal is not to be received from the UE, or
receiving, from the UE, the uplink reference signal based at least in part on the remaining portion.

29. The method of claim 28, further comprising:
transmitting, to the UE, information identifying the threshold.

30. The method of claim 27, further comprising:
transmitting, to the UE, information identifying the threshold.

* * * * *